United States Patent [19]

Hayashi et al.

[11] Patent Number: 4,469,209
[45] Date of Patent: Sep. 4, 1984

[54] VISCOUS FLUID COUPLING DEVICE

[75] Inventors: Masaharu Hayashi; Ryoichi Kuga, both of Aichi, Japan

[73] Assignee: Aisin Seiki Co., Ltd., Kariya, Japan

[21] Appl. No.: 288,449

[22] Filed: Jul. 30, 1981

[30] Foreign Application Priority Data

Jul. 30, 1980 [JP] Japan ................. 55-104805

[51] Int. Cl.³ .............. F16D 35/00; F16D 43/25
[52] U.S. Cl. .................... 192/58 B; 192/82 T
[58] Field of Search .................. 192/58 B, 82 T

[56] References Cited

U.S. PATENT DOCUMENTS

| | | | |
|---|---|---|---|
| 3,463,282 | 8/1969 | Fujita | 192/58 R |
| 3,587,801 | 6/1971 | Riner | 192/82 T |
| 3,858,697 | 1/1975 | Brewer et al. | 192/82 T |
| 3,972,399 | 8/1976 | Bopp | 192/58 B |
| 4,298,111 | 11/1981 | Hayashi | 192/82 T |
| 4,351,426 | 9/1982 | Bopp | 192/82 T |

*Primary Examiner*—Cornelius J. Husar
*Assistant Examiner*—Joseph A. Fischetti

*Attorney, Agent, or Firm*—Sughrue, Mion, Zinn, Macpeak, and Seas

[57] ABSTRACT

A viscous fluid coupling device is comprised of a drive rotor having axially extending annular projections on opposite surfaces thereof, a casing surrounding said rotor and having axially extending annular projections interposed between the annular projections on one side of said rotor, a separator disc secured within said casing to divide the interior of said casing into a reservoir chamber and a working chamber, said disc having axially extending annular projections interposed with the annular projections on the other surface of said rotor and having first and second openings angularly offset from each other at different radial distances, a valve strip slidably engaging said disc for controlling the opening and closing of the openings under the control of a temperature responsive bimetallic coil. The valve strip will open the radially outer opening at a first temperature and subsequently open the radially inward opening at a second temperature greater than the first temperature to sequentially provide a viscous fluid to the two sets of interposed annular projections for driving a fan secured to the housing at two different speeds.

1 Claim, 5 Drawing Figures

VISCOUS FLUID COUPLING DEVICE

BACKGROUND OF THE INVENTION

The present invention is directed to a viscous fluid coupling device and more particularly to a viscous fluid coupling device of the type having a separator disc in which a plurality of openings are provided which are angularly out of phase with each other and located at different radial distances relative to the center of the disc, and a valve member rotatable relative to said disc and cooperating with said openings to control the output torque produced by the couplings in at least three different stages.

Conventional viscous fluid coupling devices are used for the activation of a fan which cools an internal combustion engine of a vehicle or the like. Generally, the quantity of viscous fluid passing from the reservoir chamber to the working chamber is controlled by means of a valve member in response to the temperature of the engine in order to prevent excessive cooling of the engine and unnecessary loss of power. In conventional viscous fluid coupling devices, the valve member serves to open and close a single aperture through which the viscous fluid enters the working chamber from the reservoir chamber. Consequently, the output torque is only provided at a single level when the aperture is open to permit the entry of the viscous fluid into the working chamber. U.S. Pat. No. 3,463,282 shows such a viscous fluid coupling device where a single supply aperture is under control of a valve member. Such conventional viscous fluid coupling devices suffer from the disadvantage that the transmission of output torque is either very small or very large so that the cooling effect is either insufficient or excessive. When the transmission of torque is greater than necessary, there is an undesirable increase in the noise level with an attendant power loss.

SUMMARY OF THE INVENTION

It is a principal object of the present invention to provide a viscous fluid coupling device for controlling the operation of a fan to supply the proper amount of cooling air for the engine while reducing the loss of power and fuel consumption.

It is another object of the present invention to provide a viscous fluid coupling device having rotatable input means, a valve member operatively connected to temperature responsive bimetal means and a separator disc having two openings therein which are angularly out of phase with each other at different radial distances from the center of the disc so as to control the flow of viscous fluid in stages for controlling the transmission of torque from the input means to the output means at different levels in accordance with the temperature which controls said bimetal means.

It is a further object of the present invention to provide a viscous fluid coupling device which is simple in construction and inexpensive to manufacture.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
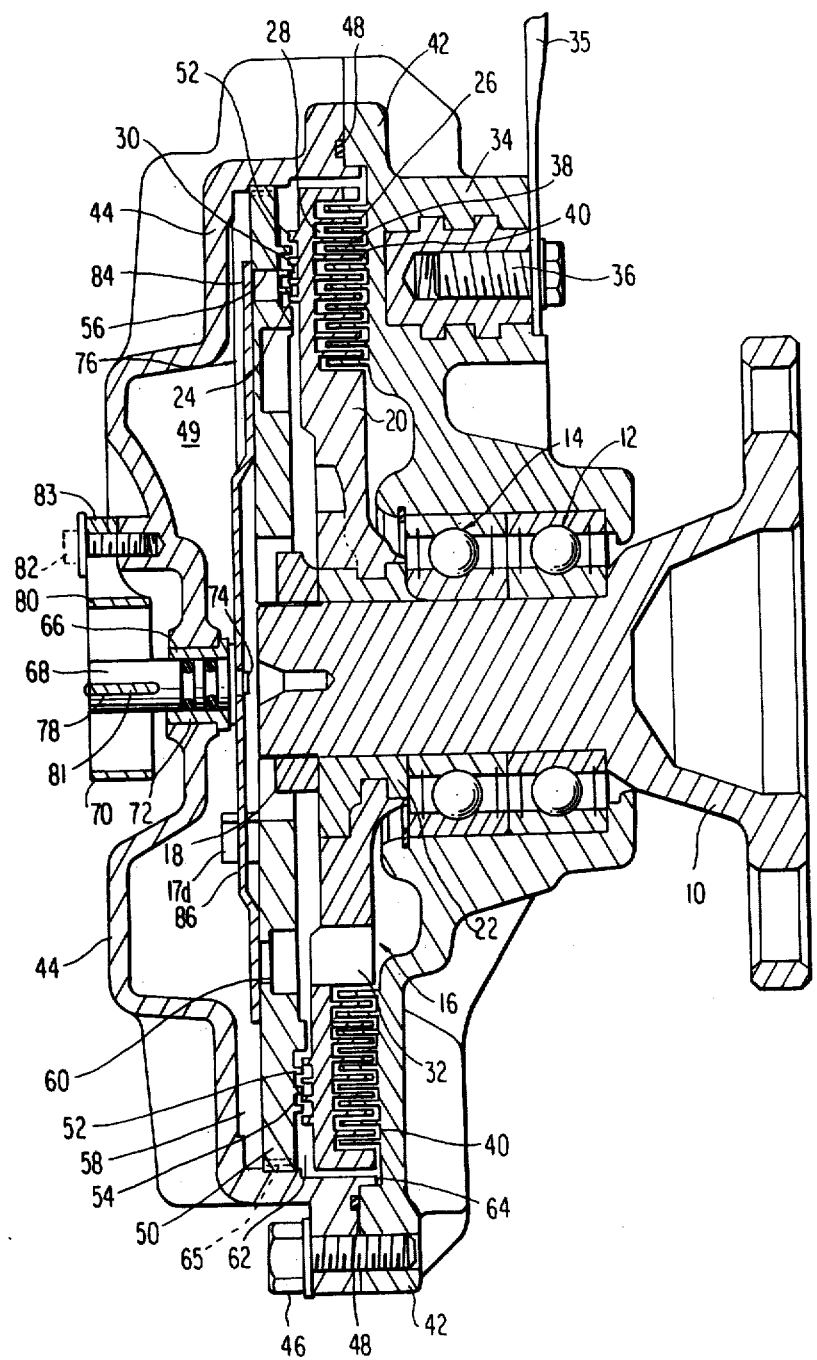
FIG. 1 is a longitudinal sectional view of the viscous fluid coupling device according to the present invention.
Figure 2:
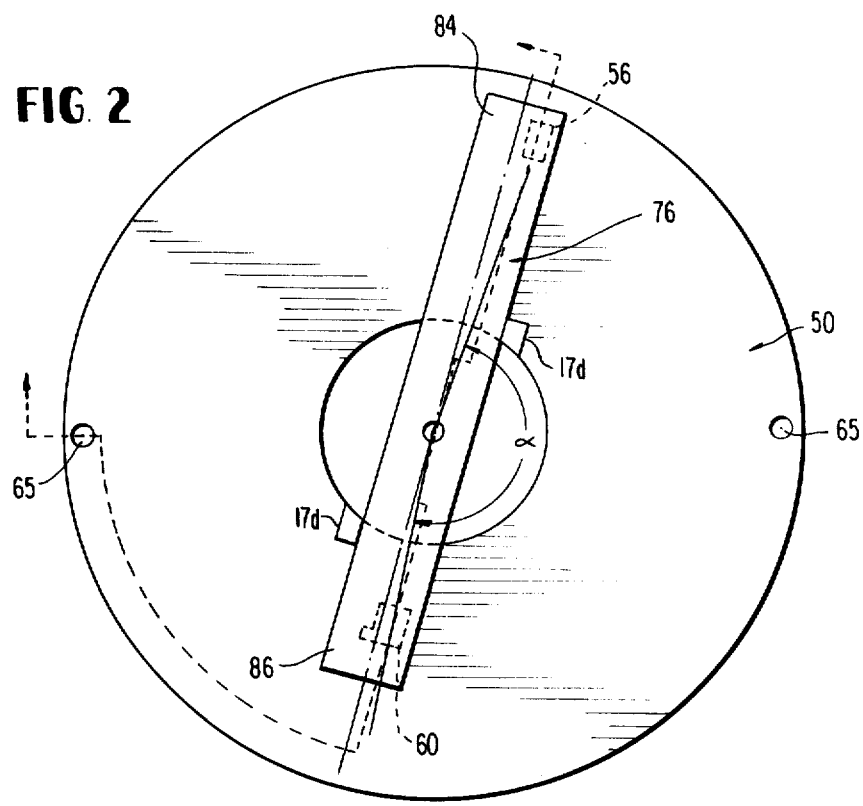
FIG. 2 is a front view of the valve member and separator disc in operative relation with respect to each other.

The drive shaft 10 shown in FIG. 1 is adapted to be driven by the engine of a motor vehicle by any suitable means either directly or indirectly. A pair of sealed anti-friction bearings 12 and 14 and a rotor 16 are secured on the drive shaft 10 by means of a nut 18 in such a manner that the rotor 16 will rotate directly with the drive shaft 10. The rotor 16 is comprised of a disc-like body 20 made of die cast aluminum and a hub member 22 made of cast iron which is inserted in a central bore of the body 20 and securely fastened thereto. The body 20 is provided with a plurality of annular projections 24 and 26 on opposite faces of the body 20 which define a plurality of grooves 28 and 30, respectively. An opening 32 is provided in a portion of the body 20 radially inwardly of the innermost groove 28. A casing 34 is rotatably mounted on the bearings 12 and 14. A fan 35, partially shown in FIG. 1, is secure to one side of the casing 34 by means of one or more bolts 36 and the opposite side of the casing 34 is provided with a plurality of annular projections 38. The projections 38 define a plurality of peripheral grooves 40 therebetween. The annular projections 26 on the body 20 are freely rotatable in the grooves 40 on the casing while the annular projections 38 on the casing are freely rotatable within the annular groove 28 on the body. A plurality of peripheral projections 42, one of which is shown in FIG. 1, are provided on the casing 34 and a cover member 44 having a plurality of similar peripheral projections is secured to the casing 34 by means of one or more bolts 46 secured in aligned apertures in the peripheral projections. A sealing member 48 is secured between the casing 34 and the cover member 44 to prevent oil from leaking. The cover member 44 defines a chamber 49 between the cover member 44 and the casing 34. A separator disc 50 is disposed between the rotor 16 and the cover member 44 within the chamber 49. The separator disc 50 is secured to the cover member 44 at the outer periphery thereof and is provided with a plurality of axially extending annular projections 52 which define a pluarlity of grooves 54 on the face thereof opposed to the rotor 16. The annular projections 52 on the separator disc 50 are freely rotatable within the annular grooves 30 on the rotor 16 while annular projections 24 on the rotor 16 are freely rotatable within the grooves 54 on the separator disc 50. The separator disc 50 is provided with first opening 56 which provides communication between the grooves 54 and the oil reservoir chamber 58 which is defined between the separator disc 50 and the cover member 44 and a second opening 60 which is located at a distance from the center of the separator disc 50 equal to the distance of the opening 32 from the axis of the drive shaft 10. The opening 60 is closer to the center of the separator disc than the opening 56 and is angularly spaced therefrom by an angle alpha which is preferably about 170° as best seen in FIG. 2. The separator disc 50 is also provided with a pair of apertures 65 which are disposed adjacent the peripheral edge thereof. A first working chamber 62 is defined between the separator disc 50 and the rotor 16 while a second working chamber 64 is defined between the rotor 16 and the casing 34.

A bushing 66 is press fitted into a central aperture in the cover member 44 and a shaft 68 which is coaxial with the drive shaft 10 is rotatably mounted within the bushing 66. A pair of O-rings 70 and 72 are interposed between the shaft 68 and the bushing 66 to provide a fluid tight seal. A valve strip 76 is secured to one end of the shaft 68 by means of a screw 74 or any other suitable fastening means. The inner end 81 of a bimetallic coil 80 is secured within a slot 78 which extends through the opposite end of the shaft 68. The outer end 83 of the bimetallic coil 80 is secured to the cover member 44 by means of a bolt 82.

The valve strip 76 is comprised of a long arm 84 and a short arm 86 extending in opposite directions from the shaft 68 along a common diameter. The long arm 84 is provided with a flat portion adjacent the outer end thereof which is disposed in sliding engagement with the flat surface of the separator disc 50 for opening and closing the aperture 56. The short arm 86 is also provided with a flat portion adjacent the outer end thereof which is disposed in sliding engagement with the flat surface of the separator disc 50 for opening and closing the opening 60. A reference numeral 17d are stoppers mounted on the separator disc 50 for valve strip 76.

In operation of the viscous fluid coupling device according to the present invention, the bimetallic coil 80 detects the temperature of the air passing through the radiator (not shown). The valve strip 76 rotates in association with the expansion and contraction of the bimetallic coil 80 in the conventional manner. Accordingly, the valve strip 76 controls the opening and closing of the openings 56 and 60 in correspondance with the temperature sensed by the bimetallic coil 80 so as to control the flow of viscous fluid from the reservoir chamber 58 into the working chambers 62 and 64. Since the rotor 16, casing 34 and cover member 44 rotate together with the drive shaft 10, the viscous fluid within the working chambers will flow back to the reservoir chamber 58 through the holes 65 as a result of centrifugal force. Accordingly, the output torque transmitted from the shaft 10 and rotor 16 to the casing 34 and the cover member 44 is reduced so as to keep the viscous fluid coupling device in the "off" condition.

When the temperature of the air exceeds a predetermined temperature, the valve strip 76 will be rotated so that the long arm 84 of the valve strip 76 will uncover the opening 56 in the disc 50 thereby permitting viscous fluid to flow from the reservoir chamber 58 into the first working chamber 62. However, due to the phase lag caused by the angle alpha between the openings 56 and 60, the viscous fluid will not flow into the working chamber 64 through the aligned openings 60 and 32 since the short arm 86 of the valve strip will still maintain the opening 60 in the closed condition. Therefore, the output torque transmitted from the shaft 10 and rotor 16 to the disc 50 and casing 34 is determined solely by the viscous fluid disposed in the grooves 30 and 54. When the temperature of the air increases beyond a second predetermined temperature, the valve strip 76 will be rotated further to uncover the opening 60 as well as the opening 56. The viscous fluid will then be able to flow from the reservoir chamber 58 into both working chambers 62 and 64. Thus the output torque transmitted from the shaft 10 and rotor 16 to the cover member 34 will be greater due to the presence of the viscous fluid in the grooves between the rotor 16 and casing 34 as well as in the grooves between the rotor 16 and the separator disc 50.

Figure 4:
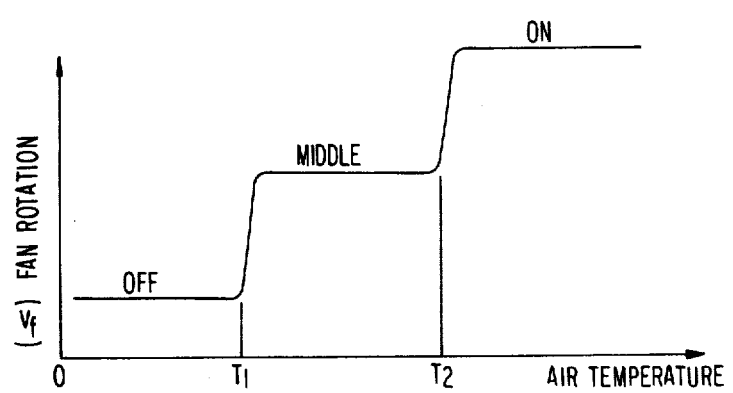
FIG. 4 is a graph showing the relationship between the rotation of a fan and the temperature affecting the control of the fan.

FIG. 4 shows the characteristic curve for the rotation of the fan relative to increasing air temperature. It is obvious from the curve that the fan will rotate at three distinct levels with the changes between the levels of rotation occuring at a first predetermined temperature T, and a second predetermined temperature $T_2$. When the fan is in the "off" condition at temperatures below $T_1$ there will still be more rotation of the fan due to the presence of oil adjacent the outer periphery of the rotor 16 beyond the grooves even though both openings 56 and 60 are closed. At temperatures between $T_1$ and $T_2$ the opening 56 will be opened thereby permitting oil to enter between a first pair of grooves to increase the speed of rotation of the fan to a middle level. When the temperature exceeds $T_2$ both apertures 56 and 60 will be opened so that both pairs of grooves will receive viscous oil to increase the rotation of the fan at a level which is considered to be the "on" condition.

Figure 5:
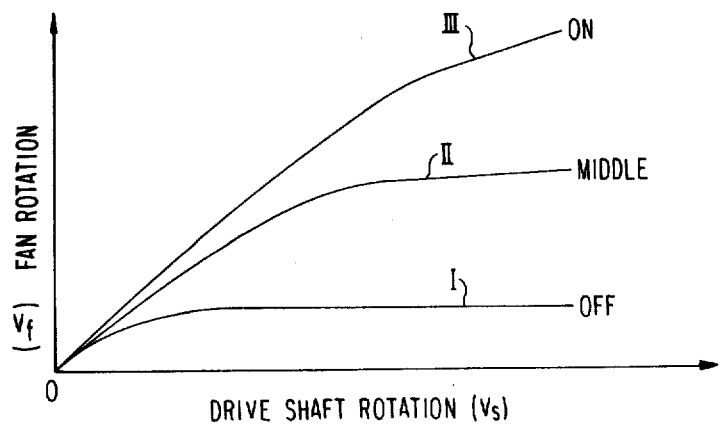
FIG. 5 is a graph showing the relationship between the rotation of a fan and the rotation of the drive shaft at different temperatures.

FIG. 5 shows the relationship between the rotation of the fan and the rotation of the shaft 10 at different temperature ranges. The curve I represents the "off" condition of the fan and shows that there will be minimum fan rotation during the rotation of the drive shaft at various speeds and at temperatures below $T_1$. The curve II shows the fan speed increasing as the speed of the drive shaft increases with the opening 56 in the open position and the opening 60 being closed at temperatures between $T_1$ and $T_2$. The curve III shows the fan speed increasing as the drive shaft speed increases with both openings 56 and 60 being in the open condition at temperatures above $T_2$.

Figure 3:
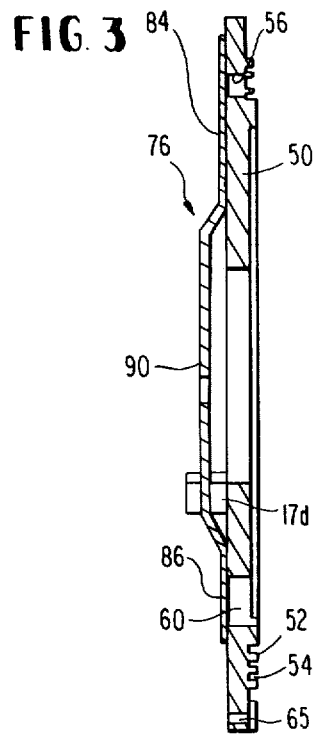
FIG. 3 is a sectional view taken along the line III—III in FIG. 2.

Due to the bowed configuration of the valve strip 76 as best seen in FIG. 3, it is best to have the openings 56 and 60 disposed 170° apart rather than having the openings disposed only 10° apart so that the control would take place by a single arm of the valve strip. The bowed condition of the valve strip would render it difficult to provide adequate opening and closing control over the radially innermost opening 60 if only a single arm valve strip was used. According to the present invention, a long arm 84 is used to control the radially outermost opening 56 while a short arm 86 is used to control the radially innermost opening 60 with the two openings being offset from each other by an angle of approximately 170°.

According to the present invention, the three stage control of the rotation of the cooling fan enables adequate cooling air to be supplied at different temperatures without excessive noise or overcooling and without wasting horsepower.

While the invention has been particularly shows and described with respect to a preferred embodiment thereof, it will be understood by those in the art that various changes in form and detail may be made therein without departing from the spirit and scope of the invention.

What is claimed is:

1. A viscous fluid coupling device comprising input means including a drive shaft having a rotor secured thereon, output means including a housing enclosing said rotor and containing a viscous fluid for transferring torque from said input means to said output means, said housing including a separator disc secured within said housing to define a reservoir chamber and a working chamber in which said rotor is located, interfitting relatively rotatable means on said rotor, said housing and said disc for transferring torque from said rotor to said housing when said viscous fluid is disposed between said interfitting means, an aperture in said rotor for transferring said fluid from one side of said rotor to the other, said separator disc having aperture means adjacent the periphery thereof through which said viscous fluid flows from said working chamber to said reservoir chamber, a first opening means through which said viscous fluid flows from said reservoir chamber to said working chamber at said interfitting means on said disc and said rotor and second opening means disposed radially inwardly of said first opening means and angularly offset therefrom said second opening means being at the same radial distance from the axis of said shaft as the aperture in said rotor, bimetal means for detecting the temperature of air passing through a radiator and a valve strip secured to said bimetal and disposed in engagement with said disc to control the opening and closing of said first and second opening means at different temperatures; said valve strip being comprised of a long arm portion for covering said first opening means and a short arm portion for covering said second opening means with said arm portions extending diametrically opposite directions with said second opening means being angularly offset from said first opening means by an angle of approximately 170° so that upon rotation of said valve strip upon an increase in temperature said first opening means will be uncovered prior to said second opening means whereby opening of said first opening means will supply fluid from said reservoir chamber to a first portion of said working chamber between said separator disc and said rotor and opening of said second opening means will supply fluid from said reservoir chamber through said aperture in said rotor to a second portion of said working chamber between said housing and said rotor.

* * * * *